(12) United States Patent
Joseph

(10) Patent No.: US 6,848,033 B2
(45) Date of Patent: Jan. 25, 2005

(54) METHOD OF MEMORY MANAGEMENT IN A MULTI-THREADED ENVIRONMENT AND PROGRAM STORAGE DEVICE

(75) Inventor: Anish Pulikottil Joseph, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 112 days.

(21) Appl. No.: 09/876,668

(22) Filed: Jun. 7, 2001

(65) Prior Publication Data

US 2002/0199069 A1 Dec. 26, 2002

(51) Int. Cl.[7] .............................................. G06F 12/06
(52) U.S. Cl. ....................... 711/147; 711/129; 711/151; 711/153; 711/158; 711/165; 711/173; 709/104; 710/56; 710/53
(58) Field of Search ............................... 711/147, 129, 711/151, 153, 158, 165, 173; 709/104; 710/56, 53

(56) References Cited

U.S. PATENT DOCUMENTS

| | | | | |
|---|---|---|---|---|
| 5,224,212 A | * | 6/1993 | Rosenthal et al. | ............. 710/53 |
| 5,848,295 A | * | 12/1998 | Anderson et al. | ............... 710/7 |
| 6,058,460 A | * | 5/2000 | Nakhimovsky | ............. 711/153 |
| 6,070,202 A | * | 5/2000 | Minkoff et al. | ............... 710/56 |
| 6,088,777 A | * | 7/2000 | Sorber | ........................ 711/171 |
| 6,304,891 B1 | * | 10/2001 | Anderson et al. | ........... 709/107 |
| 6,442,661 B1 | * | 8/2002 | Dreszer | ...................... 711/170 |
| 6,507,903 B1 | * | 1/2003 | Beatty et al. | ............... 711/173 |
| 6,519,686 B2 | * | 2/2003 | Woodring et al. | .......... 711/147 |

OTHER PUBLICATIONS

Inohara et al., "Using huge address spaces to construct cooperative systems," pp 85–92, IEEE, Apr. 1993.*
Rezaei et al., "A new implementation technique for memory management," pp 332–339, IEEE, Apr. 2000.*

* cited by examiner

Primary Examiner—Matthew Kim
Assistant Examiner—Stephen Elmore

(57) ABSTRACT

A method for managing a memory pool containing memory blocks between a producer thread and a consumer thread running in parallel within a process is disclosed. The method places free memory blocks in a first group in the memory pool and allocates on demand a memory block from the first group to the producer thread. The allocated memory block is shared between the producer thread and the consumer thread. Once the allocated memory block is no longer required, the consumer thread deallocates the allocated memory block by placing the deallocated memory block in a second group of the memory pool. Deallocated memory blocks in the second group are moved to a third group only when the third group is empty. Memory blocks in the third group are moved to the first group only when the third group is non-empty. A locking mechanism is not required in such a multi-threaded environment.

7 Claims, 3 Drawing Sheets

METHOD OF MEMORY MANAGEMENT IN A MULTI-THREADED ENVIRONMENT AND PROGRAM STORAGE DEVICE

FIELD OF INVENTION

This invention relates, generally, to a method of managing memory, and more specifically, to a method of managing memory in a multi-threaded environment without the use of any locking mechanism.

BACKGROUND

In allocating memory for a computer program, older programming languages require that the size of an array or data item be declared before the program is compiled. Moreover, the size of the array or data item could not be exceeded during run-time unless the program was changed and recompiled. Today, however, most modern programming languages, including C and C++, allow the user to request memory blocks from the system memory at run-time and release the memory blocks back to the system memory when the program no longer needs the memory blocks.

The C programming language provides memory management capability with a set of library functions known as "storage management" routines. The most basic memory allocation function is called malloc which allocates a requested number of bytes of memory and returns a pointer to the starting address of the memory allocated. Another function known as free returns the memory previously allocated by malloc so that it can be allocated again for use by other routines.

For applications in which memory allocation occurs in parallel and asynchronously, for example, in a multi-threaded process, the malloc and free storage management functions must be properly managed to avoid corruption of the memory resource. Corruption may occur where one thread is modifying a global structure when another thread is trying to read it. The code that implements the threads in the multi-threaded process has to be "code-locked" so that at any one time, only a single thread executes a storage management function to completion before another thread is allowed to execute a similar function. Code-locking is typically implemented using a global locking mechanism, such as a mutex. When one thread calls any of the memory management routines (e.g., malloc, free, realloc), it locks the global locking mechanism so that the other threads are prevented from executing any memory management routine until the memory management routine called by the first thread has completed. The other threads will have to wait until the first thread releases the global locking mechanism. The locking mechanism therefore effectively serializes access to the memory. Thus, in a multi-threaded process in which memory allocation functions are used extensively, the need for such a locking mechanism seriously compromises the speed of the system. U.S. Pat. No. 6,058,460 is an example of a multi-threaded system that uses a locking mechanism for memory management.

Such a generic locking mechanism though necessary in some multi-threaded applications is not always essential or ideal in other multi-threaded applications.

SUMMARY

According to one aspect of the present invention, there is provided a method for managing a memory pool containing memory blocks between a producer thread and a consumer thread running in parallel within a process. Free memory blocks are placed in a first group in the memory pool. A memory block is allocated on demand from the first group to the producer thread. The allocated memory block is shared between the producer thread and the consumer thread. Once the allocated memory block is no longer required, the consumer thread deallocates the allocated memory block by placing the deallocated memory block in a second group of the memory pool. At least one deallocated memory block is moved from the second group to a third group when the third group is empty. At least one memory block is also moved from the third group to the first group only when the third group is non-empty.

According to another aspect of the present invention, there is provided a program storage device readable by a computing device, tangibly embodying a program of instructions that is executable by the computing device to perform the above method.

According to yet another aspect of the present invention, there is provided a method for managing memory amongst a producer thread and a plurality of consumer threads running in parallel within a process. The method involves partitioning the memory into a plurality of memory pools, wherein each memory pool includes a plurality of memory blocks. The method also includes associating at least one of the memory pools to each of the plurality of consumer threads. Each memory pool is managed to be accessed by the producer thread and an associated consumer thread according to the method described previously.

BRIEF DESCRIPTION OF DRAWINGS

The invention will be better understood with reference to the drawings, in which.

DETAILED DESCRIPTION OF THE PREFERRED EMBODIMENT

Figure 1:
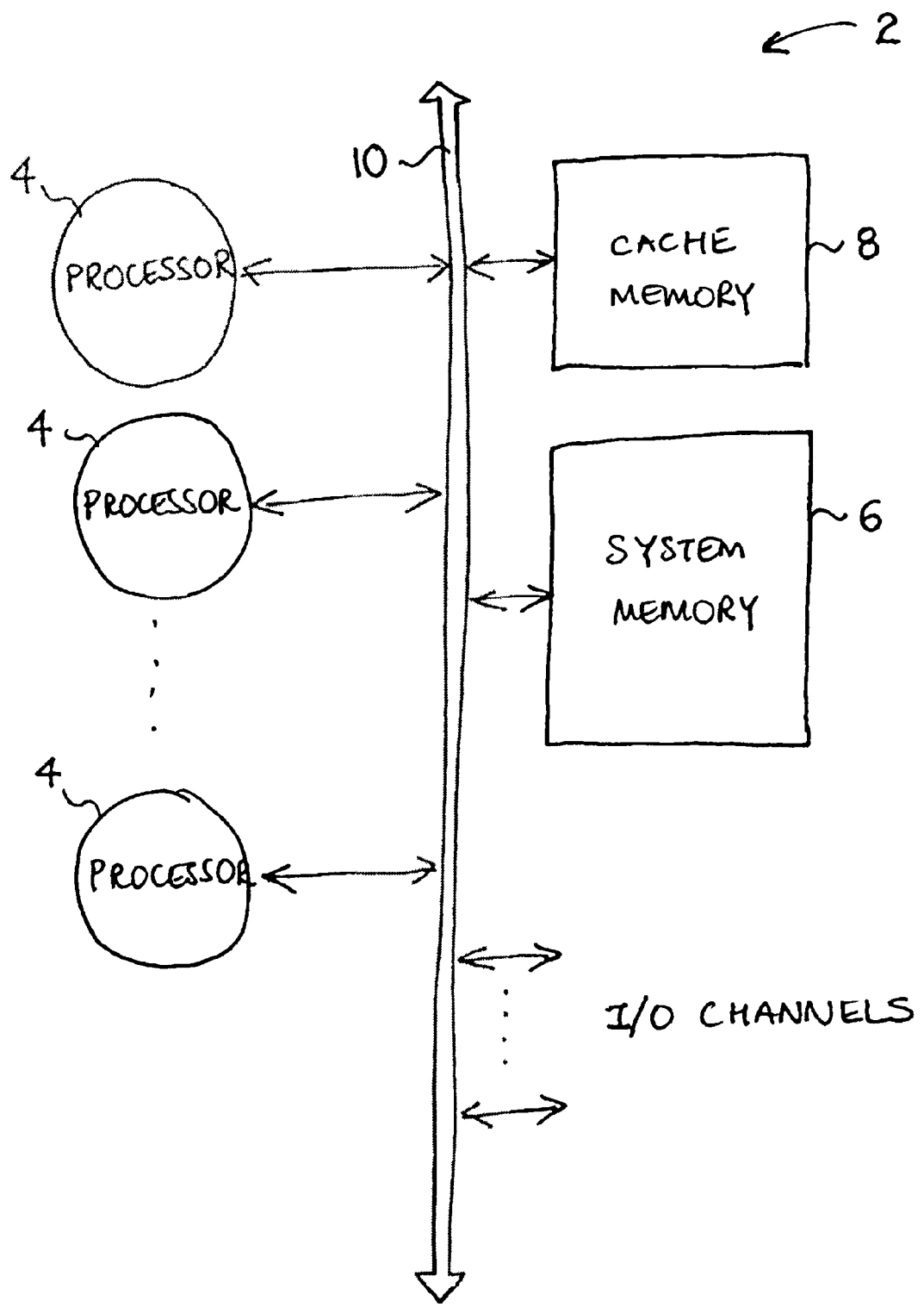
FIG. 1 is a schematic drawing of a multi-processing computing device on which a multi-threaded application may be executed.

FIG. 1 is a representation of a computing device, such as a multi-processing computing device 2, including individual processors 4 interconnected to a system memory 6 and a cache memory 8 through a system bus 10. The processors 4 share access to the system memory 6 and the cache memory 8 as well as other input/output (I/O) channels and peripheral devices (not shown). The computing device 2 also includes a program storage device (not shown), such as an EPROM, EEPROM, ROM or the like. Each processor 4 is used to execute one or more processes or applications that are stored as a program of instructions on the program storage device.

Figure 2:
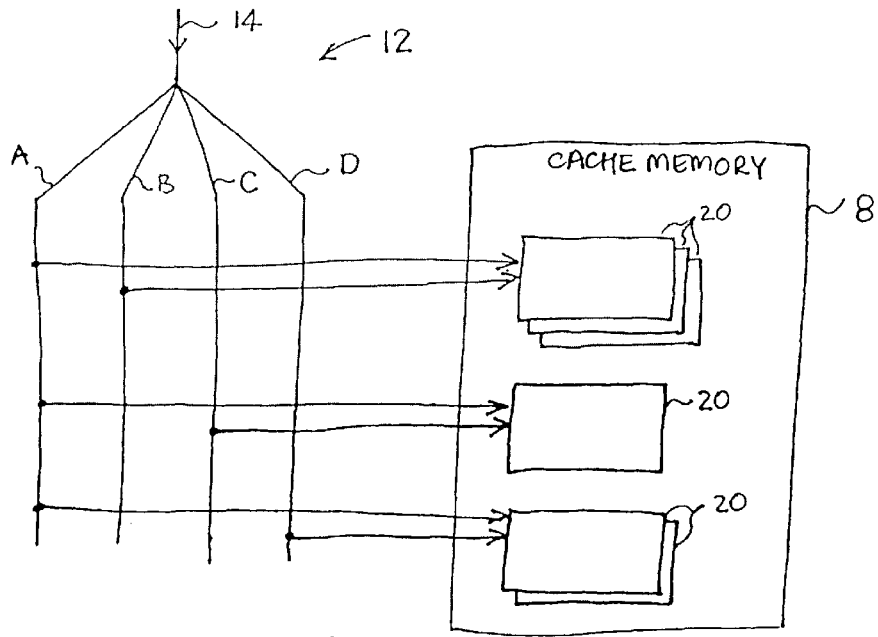
FIG. 2 is a schematic drawing showing an example of the multi-threaded application in FIG. 1 having threads that have access to memory pools.

FIG. 2 shows one such application 12 that may be executed on one or more of the processors 4. The application 12 includes, in this particular case, a single thread 14 which during execution may include a multi-threaded portion having four threads A, B, C, D. Although four threads A, B, C, D are shown, the number of threads running at any given time can change since new threads may be repeatedly created and old threads destroyed during the execution of the application 12. Each of the threads A, B, C, D, for example, may run on a corresponding one of the processors 4. In other applications, all or multiple threads A, B, C, D can run on a single processor 4.

Figure 3:
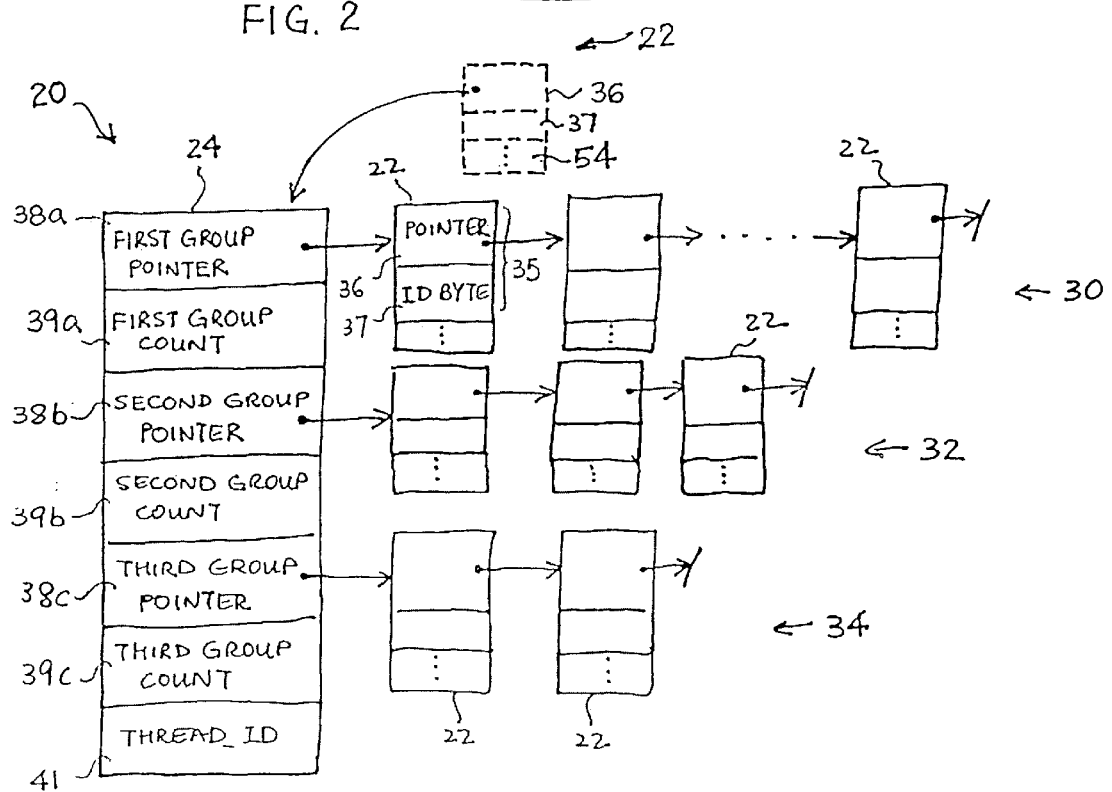
FIG. 3 is a schematic drawing of one of the memory pools in FIG. 2 showing the organization of memory blocks within the memory pool.

Each of the threads A, B, C, D may allocate one or more sections of memory from the cache memory 8 as shown in FIG. 2. Each section of memory is also known as a memory pool 20. Thus, each thread A, B, C, D is associated with one or more allocated memory pools 20 for use in executing its operations. In FIG. 2, thread A of the application 12 is shown without its own memory pool 20, whereas threads B, C, D are allocated with one or more memory pools 20. Each memory pool 20 includes memory blocks 22 of a predetermined size. The memory blocks 22 in each memory pool 20 are organized using a control data structure 24 as shown in FIG. 3 for use in a memory management method according to the present invention.

Each memory block 22 may belong to one of three groups within the memory pool 20. The three groups include a first group 30 for holding free memory blocks 22 for allocating to the thread A, a second group 32 for holding memory blocks 22 deallocated (also known as freed by those skilled in the art) by an associated thread B, C, D and a third group 34 used as an intermediary store for transferring memory blocks 22 from the second group 32 to the first group 30.

The control data structure 24 and a header 35 of a memory block 22 may be defined using the following pseudo code:

During the execution of the threads A, B, C, D, thread A is allowed to allocate and free memory blocks 22 from and to any of the memory pools 20 associated with the threads B, C, D. When deallocating an allocated memory block, thread A returns the memory block to the memory pool 20 from which the memory block 22 is allocated from earlier. However, if thread A does not deallocate the memory block 22 itself, then threads B, C, or D associated with the memory pool 20 will in association with thread A, under program control, deallocate the memory block 22 to its respective memory pool 20. The details of managing the memory blocks 22 in such a multi-threaded configuration will be discussed later.

An example of an application 12 using such a multi-threaded configuration is an alarm processing application in a network management system (not shown). In the system, equipment such as routers, switches, hubs etc. sends alarms to a computer or node on which the alarm processing application resides. The computer receives the alarms and executes the alarm processing application to process the alarms. The alarms are typically different for the different equipment and generally require different responses. The above multi-threaded configuration is therefore suitable for implementing the alarm processing application. For example, threads B, C, D may be alarm-processing threads while thread A may be a communications thread. Thread A receives an alarm, determines its source and forwards the alarm to an appropriate alarm-processing thread B, C, D for processing.

```
typedef struct memHead { /* memory block header */
    union {
        struct memHead * __next;      /* When block is free __next points to a next free block */
        struct memPool * __myPool;    /* When allocated, __myPool points to an associated memory pool */
    }u;
    int identity;
}memHead_t;
typedef struct memPool {              /* One such structure per thread per memory block size */
    memHead_t *first;                 /* points to first group of free memory blocks */
    short first_group_count;          /* number of memory blocks remaining in the first group */
    memHead_t *second;                /* points to second group of deallocated memory blocks */
    short second_group_count;         /* number of memory blocks remaining in the second group */
    memHead_t *third;                 /* points to third group of free memory blocks */
    short third_group_count;          /* number of memory blocks remaining in the third group */
    short threadId;                   /* identity of thread to which the memory pool is associated */
} memPool_t;
```

The header 35 includes a pointer 36 which either points to a next free memory block 22 or to the control data structure 24. The header 35 also includes an identity data item 37 which is initialized with an identity datum to mark the memory block 22 as one that can be operated on by the memory management method.

The memory blocks 22 are organized within each group 30 using a queue or linked-list. Three pointers 38a–c in the control data structure 24 point to the start of each of the queues of memory blocks 22. However, other data structures known to those skilled in the art can also be used. Similarly, three counters 39a–c, associated with the three groups 30, 32, 34 are provided to keep track of the number of memory blocks in each of the groups 30, 32, 34. These counters 39a–c are updated as and when the number of memory blocks 22 in each group 30, 32, 34 changes. The control data structure 24 also includes a thread_ID data item 41 which stores the identity of the thread B, C, D to which the memory pool 20 is associated. The purpose of the thread_ID data item 41 will be explained later.

Figure 4:
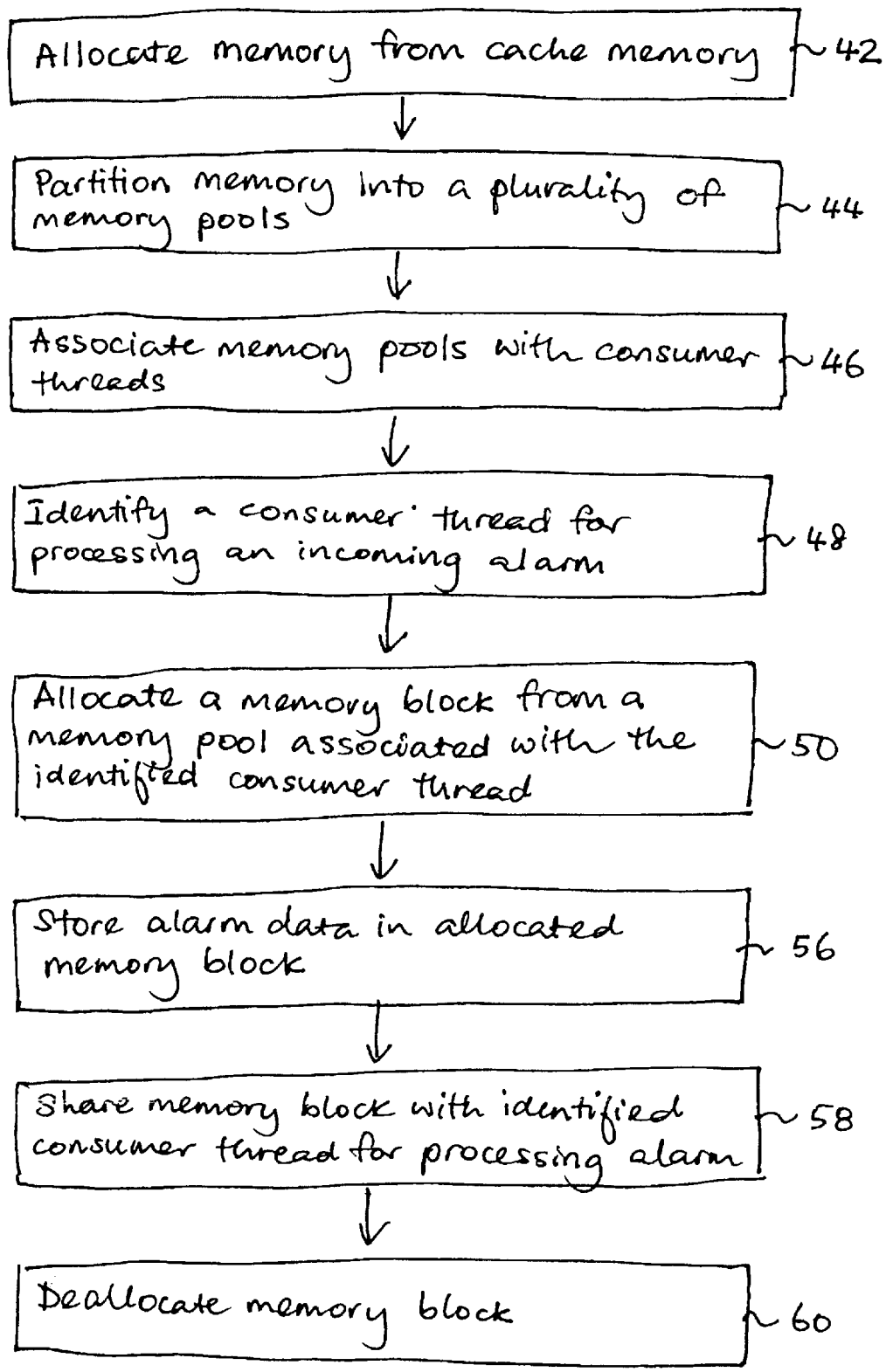
FIG. 4 is a flowchart showing a sequence of steps for managing the memory blocks in FIG. 3.

Using more generic terms, the communication thread A will be hereinafter termed as a producer thread A and the alarm-processing threads B, C, D are termed as consumer threads B, C, D. FIG. 4 is a flowchart showing a sequence 40 of steps for managing the memory blocks 22 in the memory pool 20. The operation of the sequence 40 is described in the context of the alarm-processing application and the memory pool 20 structure shown in FIG. 3.

The sequence 40 starts when the application 12 starts executing the producer thread A and the three consumer threads B, C, D in parallel as shown in FIG. 2. The application 12 allocates memory from the cache memory 8 in a step 42 and partitions the memory into a plurality of memory pools 20 in a step 44. The application 12 associates one or more memory pools 20 to each of the consumer threads B, C, D in a step 46. FIG. 2 shows three, one and two memory pools 20 associated with threads B, C, and D respectively. In this initial state, the memory blocks 22 in each memory pool 20 are placed in the first group 30 of each memory pool 20. The second and third groups 32, 34 are empty. The counter 39a associated with the first group 30 is updated to indicate the number of memory blocks 22 in the first group 30.

When the producer thread A receives an alarm from one of the equipment, the producer thread A determines which consumer thread B, C, or D is appropriate to process the alarm in a step 48. For illustration purposes, assume consumer thread B is identified to process the alarm. The producer thread A then proceeds to allocate a memory block 22 from the first group 30 of an appropriate memory pool 20 associated with the consumer thread B in a step 50. A memory block 22 in the first group 30 is allocated in the step 50.

For the structure shown in FIG. 3, this memory block 22 is taken from the head of the queue pointed to by the pointer 38a. The allocated memory block 22 is shown in dotted lines to be removed from the queue in FIG. 3. The pointer 36 in the header portion of the allocated memory block 22 is set to point to the control data structure 24 of the memory pool 20. The pointer 38a and the counter 39a of the first group 30 in the control data structure 24 are adjusted and updated accordingly.

The producer thread A stores the alarm data to a data portion 54 (not defined in the pseudo code above) of the allocated memory block 22 in a step 56. The producer thread A may pre-process the alarm data before storing it to the data portion 54. The producer thread A next forwards the memory block 22 to the consumer thread B for subsequent processing. The producer thread A and the consumer thread B share access to the alarm data stored in the allocated memory block 22 and cooperates to respond to the alarm in a step 58.

When the consumer thread B has completed processing the alarm, it no longer requires the allocated memory block 22. The consumer thread B then deallocates the allocated memory block 22 back to the memory pool 20 in a step 60. The deallocated memory block 22 is placed in the second group 32 of the memory pool 20 by manipulating the pointers 36 and 38b accordingly. The counter 39b is also updated to indicate that one more memory block 22 is added to the second group 32.

So far, a memory block 22 has been described to be allocated from the first group 30 of the memory pool 20 and deallocated back to the second group 32 of the memory pool 20. With the further allocation and deallocation of memory blocks 22 in a similar manner, there will come a point in time when memory blocks 22 are no longer available in the first group 30 but are all held in the second group 32. A scheme is therefore required for moving the deallocated memory blocks 22 from the second group 32 back to the first group 30 for reuse. This scheme may be incorporated into step 60. As memory blocks 22 are deallocated, the counter 39b associated with the second group 32 is checked to determine if the number of deallocated memory blocks 22 has reached a first predetermined number and if the third group is empty. If it is determined that both conditions are met, the deallocated memory blocks 22 are moved from the second group 32 to the third group 34. The pointers 38b, 38c and the counters 39b, 39c are updated accordingly. The third group 34 is now non-empty.

There is also a possibility during the step 50 that no memory block 22 is available in the first group 30. The step 50 may be enhanced to include moving memory blocks 22 from the third group 34 to the first group 30 when the first group 30 is found to be empty. To move memory blocks 22 between the two groups 30, 34, the producer thread A in executing the step 50 determines if the third group 34 is non-empty. If the third group 34 is determined to be non-empty, the memory blocks 22 is moved from the third group 34 to the first group 30. The pointers 38a, 38c and the counters 39a, 39c are updated accordingly. The third group 34 is now empty. Access to the memory blocks 22 in the third group 34 by the producer thread A and the consumer thread B is therefore synchronized using the counter 39c. Such a synchronization scheme prevents simultaneous access of the memory blocks in the third group by the producer thread A and the consumer thread B, thereby ensuring that the third group is not corrupted.

In the event that both the first group 30 and the third group 34 are found to be empty, the producer thread A in executing the step 50 may proceed to further allocate one or more memory blocks 22 from the system memory 6. The pointer 36 of each memory block 22 that is allocated from the system memory 6 is set to point to the memory pool 20 from which the producer thread A fail to allocate a memory block 22. Where such memory blocks 22 are allocable from the system memory 6, memory blocks 22 that are deallocated are returned to the system memory 6. In the step 60, as each memory block is deallocated, the total number of memory blocks 22 in the memory pool 20, that is in all three groups 30, 32, 34, is determined. If the total number of memory blocks 22 reaches a second predetermined number, the deallocated memory block 22 is returned to the system memory 6. This second predetermined number is larger than the first predetermined number.

Two routines, malloc and free, are implemented to incorporate the memory management method discussed above. These two routines are callable by the threads A, B, C and D when performing the step 50 and the step 60. Thread A calls the malloc routine to obtain a memory block 22 and threads B, C, D call the free routine to return a memory block 22. The partial pseudo code for the two routines is given below.

malloc routine

```
malloc( )
{
    If (the first group is not empty)
    {
        remove a memory block from the first group;
        set __myPool pointer in the memory block header to point to the
        control data structure of the memory pool;
        set first pointer to point to a next free memory block in the first
        group;
        decrement first__group__count;
        return pointer that points to a data portion of the memory block;
    }
    /* If the first group is empty, determine if the third group
    is also empty */
    if (the third group is not empty) /* by checking the
    third__group__count */
    {
        move all the memory blocks from third to first group;
        set third__group__count to zero;
        set first__group__count to the number of blocks moved;
        proceed to allocate a memory block from the first group
        as above;
    }
    /* if both the first group and the third group are empty */
    malloc a memory block from the system memory of required size;
    /* including size of header */
    set __myPool to point to the control data structure of the memory
    pool; initialize identity;
    return pointer which points to a data portion of the memory block
}
```

-continued

```
free routine free( )
{
    if (total number of blocks in first, second and third group > second
    predetermined number)
    {
        return the memory block to the system memory;
    }
    else
    {
        return the memory block to the second group;
        if (number of memory blocks in the second group > first
        predetermined number)
        {
            if (third group is empty)
            {
                move the memory blocks from the second group to
                the third group; set third_group_count to the
                number of memory blocks moved; set
                second_group_count to 0;
            }
        }
    }
}
```

The free routine may be further enhanced to include checking if a calling thread bears the same thread identity as the memory pool 20 to which a memory block 22 is to be returned. For example, thread A may call the free routine to return a memory block 22 to a memory pool 20 associated with thread B. In such a case, the free routine returns the memory block 22 to the first group 30 or the third group 34 instead of the second group 32.

Advantageously, the memory management method provides substantial improvement in the speed performance of the particular multi-threaded application over conventional schemes which require a locking mechanism for restricting access to a memory pool 20 to a single thread at a time. Using the locking mechanism can significantly degrade the performance of a multi-threaded application. Once a thread makes a memory management function call, all other threads must wait until the thread has finished performing its memory management function. The use of the locking mechanism effectively serializes memory access. By eliminating the locking mechanism in the above multi-threaded application 12 and providing separate memory pools 20, each thread can execute in parallel to improve the overall system throughput.

Although the invention is described using the preferred embodiment, it should not be construed to be limited as such. For example, the invention may be practiced in an application that has one producer thread and a single consumer thread.

I claim:

1. A method for managing a memory pool containing memory blocks between a producer thread and a consumer thread running in parallel within a process, said method comprising:

placing free memory blocks in a first group;

allocating on memory block in a first group to the producer thread;

sharing said allocated memory block between the producer thread and the consumer thread;

deallocating said allocated memory block by the consumer thread by placing said deallocated memory block in a second group;

moving at least one deallocated memory block from said second group to a third group by the consumer thread only when said third group is empty and indicating that said third group is non-empty thereafter; and moving at least one memory block from said third group to said first group by the producer thread only when said third group is non-empty.

2. A method according to claim 1, wherein moving at least one deallocated memory block from said second group to a third group includes moving memory blocks from said second group to said third group only when said third group is empty and when there is a first predetermined number of deallocated memory blocks in said second group.

3. A method according to claim 1, further including:

allocating a memory block from a system memory to the producer thread when both said first group and said third group are empty.

4. A method according to claim 3, further including:

deallocating a memory block to said system memory when there is a second predetermined number of memory blocks in said first, second and third groups, said second predetermined number being larger than said first predetermined number.

5. A method according to claim 1, further including:

allowing the producer thread to deallocate an allocated memory block to either said first group or said third group.

6. A method for managing memory amongst a producer thread and a plurality of consumer threads running in parallel within a process, said method comprising:

partitioning the memory into a plurality of memory pools, wherein each memory pool includes a plurality of memory blocks, associating at least one of the memory pools to each of said plurality of consumer threads;

placing free memory blocks in a first group of each memory pool;

allocating on demand a memory block from said first group of one of the memory pools to the producer thread;

sharing said allocated memory block between the producer thread and the consumer thread associated with said one of the memory pools;

deallocating said allocated memory block by the consumer thread by placing said deallocated memory block in a second group of said one of the memory pools;

moving at least one deallocated memory block from said second group to a third group of said one of the memory pools by the consumer thread only when said third group is empty and indicating that said third group is non-empty thereafter; and moving at least one memory block from said third group to said first group by the producer thread only when said third group is non-empty.

7. A program storage device readable by a computing device, tangibly embodying a program of instructions, executable by the computing device to perform the method for managing a memory pool containing memory blocks between a producer thread and a consumer thread running in parallel within a process, the method comprising:

placing free memory blocks in a first group;

allocating on demand a memory block from said first group to the producer thread;

sharing said allocated memory block between the producer thread and the consumer thread;

deallocating said allocated memory block by the consumer thread by placing said deallocated memory block in a second group;

moving at least one deallocated memory block from said second group to a third group by the consumer thread only when said third group is empty and indicating that said third group is non-empty thereafter; and moving at least one memory block from said third group to said first group by the producer thread only when said third group is non-empty.

* * * * *